United States Patent

Blackshear et al.

(10) Patent No.: US 7,174,233 B1
(45) Date of Patent: Feb. 6, 2007

(54) QUALITY/RELIABILITY SYSTEM AND METHOD IN MULTILEVEL MANUFACTURING ENVIRONMENT

(75) Inventors: Edmund Blackshear, Wappingers Falls, NY (US); Michael W. Bolch, Raleigh, NC (US); Biao Cai, Carmel, NY (US); George M. Hurtis, Rochester, MN (US); Eric T. Lambert, Wappingers Falls, NY (US); Shu Chen Lim, Brookfield, CT (US); John S. Maresca, Hopewell Junction, NY (US); Paul A. Zulpa, Westbury, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/162,104

(22) Filed: Aug. 29, 2005

(51) Int. Cl.
*G06F 19/00* (2006.01)

(52) U.S. Cl. ...................................... 700/109
(58) Field of Classification Search ............... 700/103, 700/108, 109, 110, 97, 121
See application file for complete search history.

(56) References Cited

U.S. PATENT DOCUMENTS

| 3,751,647 | A  | * | 8/1973 | Maeder et al. ............... 713/401 |
| 6,385,739 | B1 | * | 5/2002 | Barton et al. ................. 714/25 |
| 6,389,366 | B1 | * | 5/2002 | Heavlin ........................ 702/84 |
| 6,615,096 | B1 | * | 9/2003 | Durrant et al. ............. 700/115 |
| 6,947,871 | B2 | * | 9/2005 | Deng et al. ................. 702/182 |
| 6,947,903 | B1 | * | 9/2005 | Perry .......................... 705/28 |
| 2002/0052862 | A1 | * | 5/2002 | Scott et al. .................... 707/1 |
| 2003/0120457 | A1 | * | 6/2003 | Singh et al. ................ 702/181 |
| 2003/0139940 | A1 | * | 7/2003 | Takemoto et al. ............. 705/1 |
| 2004/0148047 | A1 | * | 7/2004 | Dismukes et al. .......... 700/100 |
| 2005/0086800 | A1 | * | 4/2005 | Heidel .......................... 29/832 |
| 2005/0209732 | A1 | * | 9/2005 | Audimoolam et al. ...... 700/216 |
| 2005/0278048 | A1 | * | 12/2005 | Chiu et al. .................... 700/99 |

* cited by examiner

*Primary Examiner*—Leo Picard
*Assistant Examiner*—Chad Rapp
(74) *Attorney, Agent, or Firm*—Richard Kotulak; Greenblum & Bernstein, P.L.C.

(57) ABSTRACT

This is a system and method for management system. The system and method includes a raw pull indicator database which receives inputs comprising data from participant nodes. A system comprises execution logic which operates on the data from the raw pull indicator. A disposition system feedbacks reliability data of the participants based on the data operated on by the system.

20 Claims, 3 Drawing Sheets

QUALITY/RELIABILITY SYSTEM AND METHOD IN MULTILEVEL MANUFACTURING ENVIRONMENT

FIELD OF THE INVENTION

The invention relates to quality control of product in a multilevel manufacturing environment and more particularly to a customer driven supplier quality/reliability system and method of use in a multiple layer manufacturing environment.

BACKGROUND DESCRIPTION

In large-scale multilevel manufacturing systems, such as those encountered when manufacturing computing equipment, complex distributed supply and manufacturing networks must be monitored to ensure the quality and reliability of the products stay above specifications. In other words, component suppliers, subsystem manufacturers as well as original equipment manufacturer (OEM) system integrators and other participants, must work together through worldwide distribution channels and global manufacturing networks to ensure quality products are delivered. In such scenarios, the OEM must take the initiative to ensure that all of the sub-tier parties are working together.

Coordinating and analyzing supplier and manufacturing quality and reliability is critical to optimizing the supplier quality system and the material flows for quality assurance. However, such coordination is often complex, time consuming and very costly. For example, collecting supplier parametric data and applying statistical process control (SPC) over the entire supply chain is usually cost prohibitive for many OEMs. Additionally, in the case of a quality problem, it may take extraordinary effort, time and expense to determine which provider, within the supply chain is responsible for the failure of a given component or the sub-system. Other problems may arise by not obtaining reliable information from all party participants. In this case, the OEM may have to expend tremendous effort to ensure that the data reported is reliable and can be trusted.

In computer manufacturing, component suppliers will manufacture components, i.e., memory chips, passive devices and printed circuit boards (PCBs), etc., to be integrated into a memory module by the subsystem manufacturer (card assembler). Prior to shipment to the card assembler, these components should be tested at their fabrication facilities, with test yield reported to the OEM. Once the components have passed such testing, they are then shipped to the card assembler, at which time the components are assembled together, tested and results reported to the OEM, and then shipped to the system integrator. The system integrator or OEM, will then manufacturer the final product for the consumer.

In this example, during in process testing at the system integrator, the system integrator may have detected that one of the subsystem components, e.g., memory card, is not properly functioning (failed). It is now incumbent upon the system integrator, to determine whether the failure of the component occurred during the final assembly process, the subassembly process or at the component manufacturer, itself. In making such a determination, it is important to ascertain whether (i) there have been reliable testing programs and (ii) the upstream vendors, component suppliers, etc. are reliably reporting failures accurately. All of these determinations require resources to undertake.

In this type of multilevel manufacturing environment, the process of determining the failure root cause and the party that is responsible for quality problems can be quite a daunting task. In one solution to such problem, the OEM would need to supervise multiple layers within the supply chain, which may include a large number of facilities. This may be cost prohibitive for many manufacturers and in the least would be very cumbersome to all involved parties. Due to perceived liabilities, it is conceivable that the upstream vendors would find such supervision intrusive and unwarranted thus denying access to their facilities.

To apply SPC over a complex multi layer system is usually cost prohibitive for the following reasons:
  the effort spent in data collection;
  the engineering know-how to identify critical parameters; and
  the workforce needed to analyze the accumulated data.

SUMMARY OF THE INVENTION

The invention includes a raw pull indicator database which receives inputs from participant nodes (site entities). The system then executes logic which operates on the data from the raw pull indicator. A disposition system feeds back supplier quality and reliability data to the participants based on the results of the analysis.

Another aspect of the invention includes obtaining data from each participant node in a supply chain and correlating the data to determine the reliability from each participant in the supply chain. A computer program receives inputs comprising yield data from participant nodes, compares the yield data, and provides a supplier quality work flow function to manage failure analysis, disposition and corrective action. Historic supplier quality management knowledge would be extracted from the knowledge base and newly obtained knowledge will be stored in this knowledge base.

DETAILED DESCRIPTION OF

Embodiments of the Invention

The invention is directed to a supplier quality management system implemented in a multilevel manufacturing environment. Among other features, the management system will drive proactive supplier quality management upon a raw pull indicator on the customer side. In one implementation, the system includes a test yield raw pull indicator database which periodically receives reports of raw pull failure rates for a customizable set of tests. A supplier quality workflow management system takes input of the raw pull data and synchronizes the supply quality problem handling. The system also includes logic to determine whether the reported data is reliable and an engineering knowledge base acquired during the supplier quality workflow management process. This knowledge can be saved for future analysis and use.

Data Sources

Figure 1:
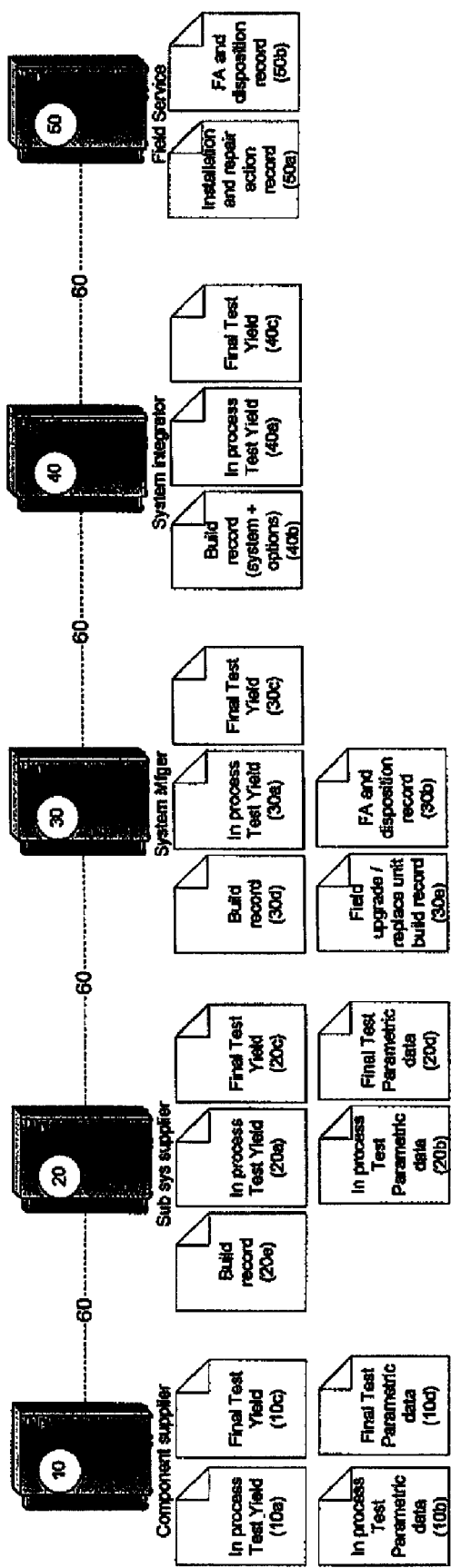
FIG. 1 illustrates data sources for implementing the invention

FIG. 1 shows data sources for implementing the invention. The data sources may be represented as nodes 10, 20, 30, 40 and 50. These are representative of component supplier, sub system suppliers, and system integrator, etc. within the supply chain. By way of illustration, the nodes may include (i) a component supplier node 10, (ii) a subsystem supplier node 20, (iii) a system manufacturer node 30, (iv) a system integrator node 40 and (v) a field service node 50. The system integrator associated with node 40 may add or integrate optional features to the system, e.g., storage, power. The nodes, as discussed in more detail below, may provide backward traceability to determine, for example, part to system assembly relationship at all stages of manufacturing.

Each of the nodes may be representative of the hardware embodiment, a software embodiment or an embodiment containing both hardware and software elements. The nodes can be computer accessible providing program code for use or in connection with any instruction execution system and used with a data processing system. Each of the nodes may be connected to one another or to a data system implementing the system and method of the invention, as represented by reference numeral 60.

In reference to FIG. 1, information will reside on or be associated with each of the nodes 10, 20, 30, 40 and 50. Although FIG. 1 shows specific data residing on or being associated with each of the nodes, it should be understood that other data may equally be provided with the system and method of the invention.

Component supplier node 10 may include (i) "in process test yield" data 10a, (ii) "in process test parametric" data 10b, (iii) "final test yield" data 10c and (iv) "final test parametric" data 10d. The subsystem supplier node 20 may also include (i) "in process test yield" data 20a, (ii) "in process test parametric" data 20b, (iii) "final test yield" data 20c, and (iv) "final test parametric" data 20d, in addition to (v) "build record" data 20e. The system manufacturer node 30 may include (i) "in process test yield" data 30a, (ii) failure analysis and disposition records 30b, (iii) "final test yield" data 30c, (iv) "build record" data 30d and (v) field upgrade and replace unit build records 30e. The system integrator node 40 may include (i) "in process test yield" data 40a, (ii) build record data 40b and (iii) "final test yield" data 40c. The field service node 50 may include installation and repair action records 50a and (ii) failure analysis and disposition records 50b.

In Process Test Yield

The "in process test yield" data is high level information or data which is representative of test results performed during the manufacturing process, prior to the final outgoing test. The test yield data is in the form of binary data, representative of a pass or fail condition. This data can be recorded in the form of a percentage of failure rate. This information can be used by a manufacturer, sub assembler, integrator, etc. to determine if a specific component, subassembly or the like has failed, and the failure rate over certain time interval. If there is a failure during a specific operational stage, the manufacturer, sub assembler, integrator, etc., can remove the component or subassembly from the production line (this activity is referred as raw pull). The operator will be required to input raw pull rate and other associated information into system.

An "in process test" may include a wire bound pull test. In this case, the test will determine the integrity of the bound wire. By using the yield data of this test, an indicator will be given of the wire bounding capability. Pass or fail will be determined by whether the measured force (parameter data) meets certain pre-defined standards.

In Process and Final Parametric Data

The "in process test parametric" data and the "final test parametric" data are lower level information which is representative of test results performed during or upon completion of the manufacturing process, respectively. This information can be used by a manufacturer, sub assembler, integrator, etc. to determine if a specific parameter, e.g., physical characteristic, meets quality standards or meets product specifications. For example, the customer may request certain timing properties of a chipset and, the manufacturer may measure response times. Similarly, the customer may request certain electrical properties of a circuit and, the manufacturer may measure voltage, resistance or current.

Comparing with raw pull yield data, the "in process test parametric" data and the "final test parametric" data are costly to monitor for each manufacturer, sub assembly, components supplier, etc. from the perspective of a downstream participant, e.g., system manufacturer. To monitor such information, the system manufacturer may require a physical presence at the facilities of the upstream participants.

Final Test Yield

The "final test yield" data is information which is representative of actual yield from a particular manufacturing process of any participant within the supply chain. This data, may be representative of yield for a specific component from a specific component supplier 10. This data is useful to all participants and is typically represented in binary form: pass or fail.

The "final test yield" is an early indicator of a successfully built final product. The "final test yield" data of an immediately preceding participant in the supply chain should, have a strong correlation with the incoming inspection test yield data of the next participant in the supply chain.

Built Records (and Upgrades)

Referring to FIG. 1, a record is built at nodes 20, 30 and 40. The record represents which components are to be provided to the next level of assembly and which components are required to build certain products. For example, to build a memory card, the record may include (i) memory device requirements, (iii) capacitor/resistor requirements and (iii) printed circuit board requirements. The record can also include system options (e.g., at node 40) or can be used to determine field upgrades, replacement units, etc. (see, block 30e at node 30). At node 50, the record 50a may include information associated with installation and repair actions.

FA and Disposition Records

In failure analysis and disposition records, an engineer will determine if either a complete failure analysis is needed or a quick diagnosis is adequate for proper disposition of manufacturing line rejection and field failure. If it is the engineer's decision to conduct complete failure analysis, the procedure/method, as described with reference to FIG. 3, will be triggered.

Implementation of Embodiments of Invention

Figure 2:
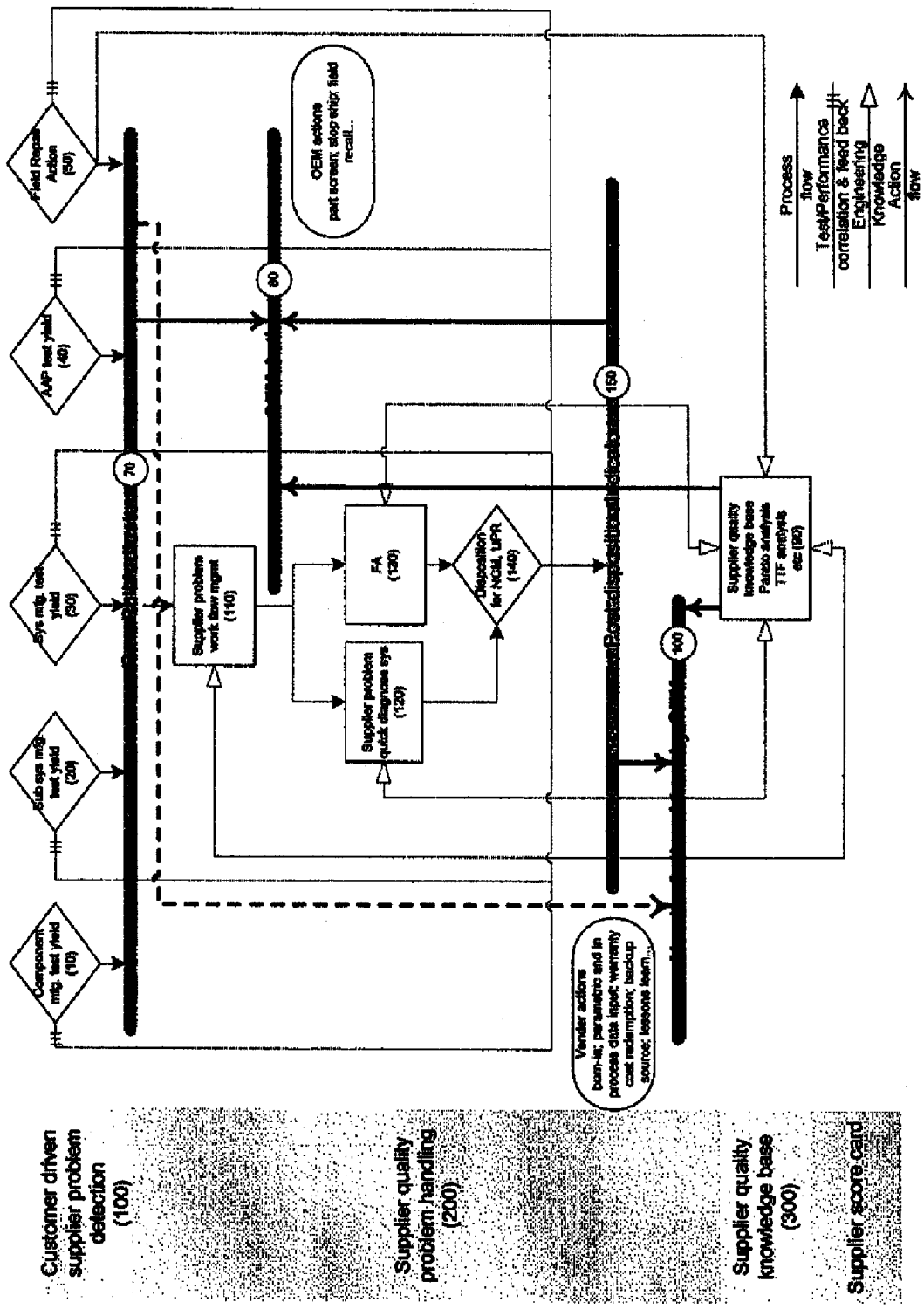
FIG. 2 illustrates a flow chart of the invention process

FIG. 2 illustrates a flow chart of an embodiment in accordance with the invention based on the data obtained in FIG. 1. FIG. 2 (and FIG. 3) may equally represent a high-level block diagram of components of the invention. The steps of FIG. 2 (and FIG. 3) may be implemented with computer program code in combination with the appropriate hardware, as discussed previously.

The invention can take the form of a computer program accessible from computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

In FIG. 2, three stages are provided, e.g., customer driven supplier problem detection 100, supplier quality problem handling 200 and supplier quality knowledge base 300. Across stages 100 and 200, a feed back loop is created between the component supplier node 10, the subsystem supplier node 20, the system manufacturer node 30, the system integrator node 40 and the field service node 50. More particularly, each of the nodes 10, 20, 30 and 40 are queried for test yield data (and in some instances, in process test yield data), and node 50 is queried for field repair actions, all of which are early indicators of a component failure and/or participant reliability. This information can then be utilized by the OEM to validate the reported data reliability from participants, e.g., component manufacturer, supplier, sub assembler, etc. For example, such information can be used to determine if the participants are accurately reporting failure rate of final inspection. If so, the ratio (raw pull rate) will be used as supplier quality performance indicator.

By way of one illustrative example, in the above processing step, the system of the invention will query each of the nodes 10, 20, 30 and 40 for final test yield data. In this step, the outgoing test yield data (as recorded) of the upstream suppliers, manufacturers, etc. (e.g., component manufacturer) will be correlated with the incoming inspection test data of a next downstream participant (e.g., sub system manufacturer), which may be part of the "in process test yield" data.

If the test data does not correlate, e.g., the outgoing data and inspection test data do not substantially correlate, a check can be made to determine if any supplier, manufacturer, assembler, integrator, etc. (e.g., component manufacturer) is reliably recording the test data or if the test program needs to be modified. This correlation may be made between any of the participants of the supply chain, and may be performed by the raw pull indicator (database and accompanying components) 70, which retrieves the required information from the nodes. The raw pull indicator database will periodically receive reports of raw pull failure rates for a customizable set of tests.

There are two types of raw pull indicators, a reliable indicator and a non-reliable indicator. The reliable indicator substantially yields strong correlation between the compared data. However, if the data is not considered to be reliable and there is not an adequate correlation between the compared test data, the OEM, e.g., system manufacturer 30 needs to drive improvement in the system by working with the upstream participants. This may include validating the test program of an upstream participant. Another example may include checking the education of the operator performing the test to determine if adequate training has been provided.

In the case that the data is reliable but there is a reported quality problem associated with any of the upstream participants (in most cases it will show a spike of raw pull failure rate) the OEM may take immediate actions, at step 80. These actions may include, for example, stop shipments, recall components, screen incoming components, etc. These actions, however, may be costly.

If the raw pull indicator demonstrates a strong correlation of a quality problem to a specific supplier, e.g., upstream participant, then vendor action may be triggered, at step 100. In embodiments, these vendor actions may include, for example, the OEM requesting:
 burn-in testing;
 parametric and in process data;
 warranty cost redemption
 manufacturing process or material change To assist in the specific action to be taken by the OEM or vendor, at step 90, information may be obtained from the OEM database which stores historical knowledge obtained via years of managing supplier quality problems. Pareto and Time to Failure (TTF) reports may also be used to assist in the determination of a specific action will be taken by the OEM or vendor. Pareto analysis includes the contributing factors of failure such as contamination problems, mishandling problems or other factors. This step is associated with the supplier quality knowledge base 300.

In supplier quality problem handling step 200, a supply problem is detected by the raw pull indicator 70, the information associated with the quality problem will be input, at step 110, to the supplier workflow management system. The inputted information in the supplier workflow management system may include, for example, failed system information, failed part information, failure rate, operator comments, customer engineer (CE) comments, etc.

The information which is obtained from the raw pull indicator may also be input to the OEM database of historical information (e.g., knowledge base). Once the information is analyzed at step 110, a quick diagnosis may be obtained, at step 120 or alternatively the process may proceed to the step of 130, where a complete failure analysis (FA) will be performed. The FA may also use information obtained from the OEM database to accelerate such analysis.

After either step 120 or step 130, the system proceeds to step 140. At step 140, a disposition may be made against nonconforming material (NCM) and/or a used part returned (UPR), which may have to go through a failure analysis. The disposition may include, for example, a determination that there is:
 a supplier induced failure;
 a manufacture induced failure;
 a design induced failure;
 there is no defect found; and/or
 there is a pending failure analysis, etc.

After this stage, the information will be entered into the post disposition database, at step 150. The information stored at step 150 may then be used in step 80 and/or step 100. So, for example, if there is an indicator of a supplier induced failure or quality problem, the vendor action, at step 100, may be triggered. Meanwhile OEM actions can also be triggered, at step 80.

Thus, by implementing the embodiments of the invention, it is now possible to determine reliability of data within the supply chain in a cost efficient and effective manner. By using the embodiments of the invention, the system and method can monitor the performance and reliability of any data in the supply chain by correlating test data, stored in data sources. That is, a comparison of "final test yield" data of an upstream participant with "incoming test" data of a downstream participant can be correlated to determine the reliability of the data. The field performance data can also be used to compare with the "final test yield" data to determined data reliability.

Figure 3:
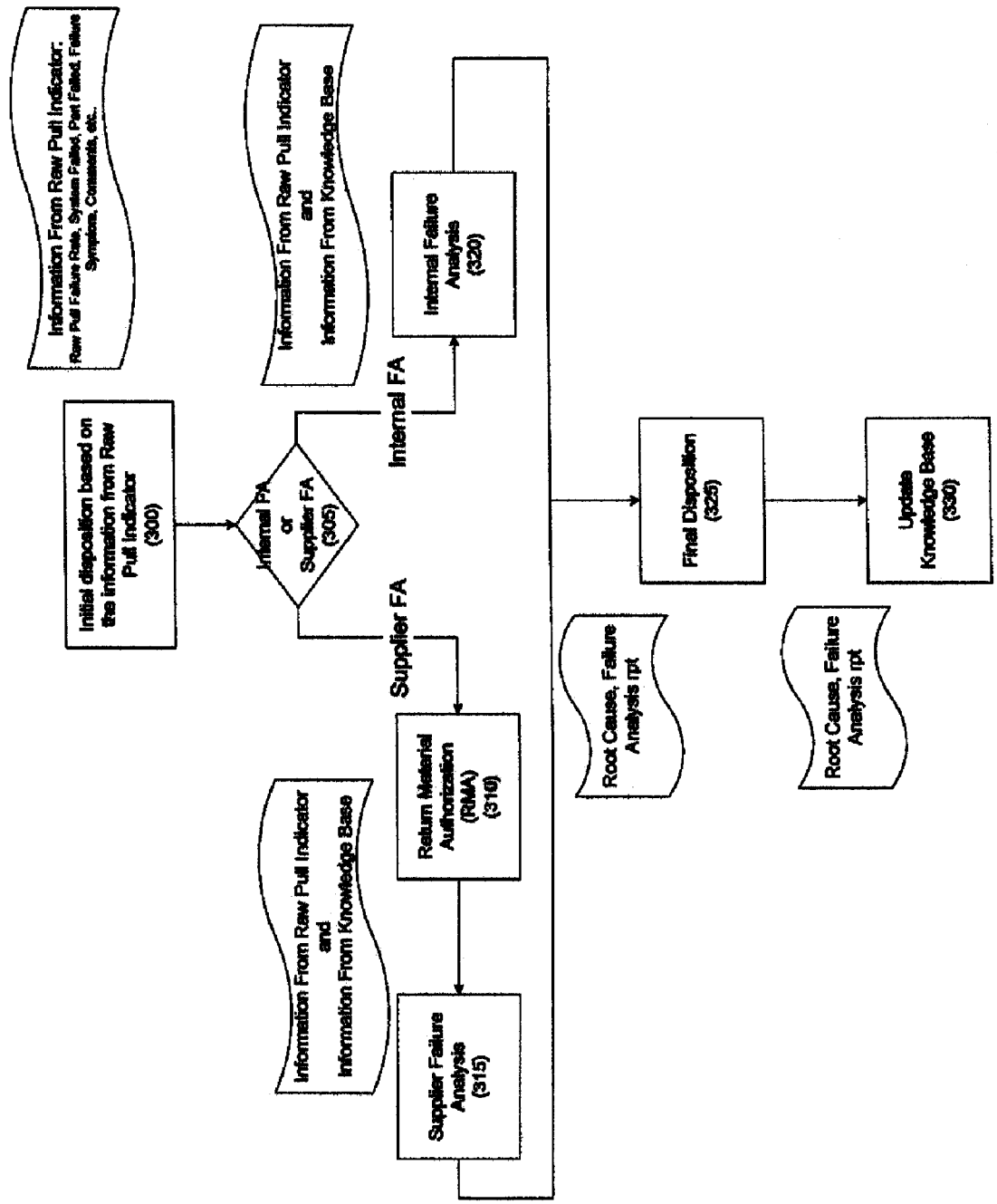
FIG. 3 illustrates a flow chart of failure analysis within the invention.

Once data is determined to be reliable, this data can then be used to determine quality problems. If there is found to be a quality problem, it is possible to selectively request certain actions to be taken by the participants, which would normally be very cost prohibitive if monitored or requested on a regular basis by the OEM. By using the embodiments of the invention, low level test data such as parametric and in process data may also be requested by suspect participants. Additionally, the OEM can now provide evidence to the participant of unreliability of its data when requesting information or actions to be taken by suspect participants FIG. 3 shows a failure analysis flow in accordance with the invention. The steps of FIG. 3 may equally represent a high-level block diagram of components of the invention implementing the steps thereof. The steps of FIG. 3 may be implemented on computer program code in combination with the appropriate hardware, as discussed previously, much like that described with reference to FIG. 2.

In FIG. 3, an initial disposition based on the information of the raw pull indicator is provided, at step 300. This information may include, for example, raw pull failure rates, systems that fail, parts that fail, failure symptoms and engineering comments, to name a few. This disposition may be made against nonconforming material (NCM) and/or a used part returned (UPR), as determined by an engineer. If there is to be a failure analysis of the NCM and/or UPR, these materials or parts will then be coded by the engineer for failure analysis.

At step 305, a determination will be made as to whether there should be an internal failure analysis or a supplier failure analysis. If there is to be a supplier failure analysis, at step 410, a return material authorization (RMA) will be triggered. If there is an RMA, the material will be returned to the supplier at step 415. The OEM will also provide information from the raw pull indicate and information from the knowledge base to the supplier, in an attempt to assist the supplier in the failure analysis.

If the failure analysis is to be conducted internally, the process will then flow to step 320. At step 320, a failure analysis may be conducted by the OEM with the information obtained from the raw pull indicator and from the knowledge base, in assisting with the failure analysis. Once a failure analysis is performed at either step 315 or step 320, the process will flow to step 325. At step 325, based on the root cause as found during the failure analysis, a final disposition may be made by an engineer, for example. This final disposition may include, in one aspect of the invention:

a supplier induced failure;

a manufacture induced failure;

a design induced failure; and/or no defect found.

At step 330, the knowledge base of FIG. 2, is updated with the knowledge acquired during the steps of FIG. 3.

While the invention has been described in terms of exemplary embodiments, those skilled in the art will recognize that the invention can be practiced with modifications and in the spirit and scope of the appended claims.

What is claimed is:

1. A management system, comprising:
   a raw pull indicator database which receives inputs comprising data from participant nodes;
   a system comprising execution logic which operates on certain data of the data from the raw pull indicator; and
   a disposition system which feedbacks quality and reliability data of the participants based on the data operated on by the system.

2. The system of claim 1, wherein the participant nodes comprise at least one of (i) a component supplier node, (ii) a subsystem supplier node, (iii) a system manufacturer node, (iv) a system integrator node and (v) a field service node.

3. The system of claim 1, wherein the participant nodes include build records which provide backward traceability of components used.

4. The system of claim 1, wherein the system compares the certain data of the data of different nodes to determine data reliability.

5. The system of claim 1, wherein each of the participant nodes are entirely hardware, entirely software or a combination of hardware and software elements.

6. The system of claim 1, wherein the data comprises at least one of in process test yield data, final test yield, and incoming inspection categorized as in-process test.

7. The system of claim 1, wherein the system enables original equipment manufacturing (OEM) engineers to customize a list of tests which are to be monitored.

8. The system of claim 6, wherein the data further comprises:
   for a first node of the participant nodes: in process parametric test data and final test parametric data;
   for a second node of the participant nodes: in process test yield data, final test parametric data and record data;
   for a third node of the participant nodes: failure analysis and disposition records, record data and field upgrade and replace unit build data;
   for a fourth node of the participant nodes: build data; and
   for a firth node of the participant nodes: installation and repair action data and failure analysis and disposition data.

9. The system of claim 8, where in the execution logic of the system requests upstream action requirements, in response to when the correlation does not satisfy a predetermined limit.

10. The system of claim 1, further comprising a failure analysis tool associated with the disposition system to assist in a determination of a specific action in response to the quality and reliability data.

11. The system of claim 10, further comprising a downstream database which stores historical information about upstream participants, the downstream database being accessible by the execution logic to assist in making the specific action of claim 10.

12. A method comprising:
   obtaining data from at least two participant source nodes in a supply chain;
   correlating the data to determine data reliability of the participants in the supply chain; and
   feeding back reliability data of the participants based upon the obtained data.

13. The method of claim 12, further comprising providing a feedback loop for connecting the at least two participant source nodes associated with each of the participants.

14. The method of claim 12, wherein the correlation of data includes correlating final test yield data of an upstream participant and incoming inspection data of a downstream participant in a multilevel manufacturing process chain.

15. The method of claim 12, wherein the correlation of data includes correlating field repair action data with upstream test yield in a multilevel manufacturing process chain.

16. The method of claim 14, further comprising making a determination that the correlation of the final test yield data of the upstream participant and yield data of the downstream participant incoming inspection meets a predetermined level and, if not so, driving an upstream action and, if so, the yield data will be considered reliable and used as a supplier quality indicator.

17. The method of claim 16, further comprising when the yield data is considered reliable, providing the reliable yield data to a quality problem workflow management system and using the reliable yield data to either provide a quick diagnosis or a failure analysis, and providing a disposition based on results of either the quick diagnosis or the failure analysis.

18. The method of claim 17, wherein:
   the disposition triggers action taken by an OEM upon upstream participants and/or upon the OEM; and
   the upstream actions include at least one of a request of the upstream participant to perform burn-in test, to submit parametric test data, to be responsible for warranty cost and the OEM develops a backup source for supplying components or subassemblies; and
   the actions upon the OEM includes at least one of:
   stop shipments from the upstream participant;
   recall components; and
   screen incoming components from the upstream participant.

19. The method of claim 12, wherein once a supplier quality problem of an unreliable participant has been identified:
   analyzing work flow management of the unreliable participant; and
   providing a diagnosis; and
   further comprising obtaining information from a user database of historical information about the participants to provide the diagnosis.

20. A computer program product comprising a computer useable medium including a computer readable program, wherein the computer readable program when executed on a computer causes the computer to:
   receive inputs comprising yield data from participant nodes;
   compare the yield data from the participant nodes;
   determine reported data reliability of participants associated with the participant nodes based on the compared data; and
   feedback reliability data of the participants based upon the compared data.

* * * * *